Aug. 26, 1952  R. C. ORTGIES  2,608,267
HORIZONTAL GAS SCRUBBER
Filed Nov. 23, 1949  2 SHEETS—SHEET 1

INVENTOR.
Raymond C. Ortgies
BY
ATTORNEY

Patented Aug. 26, 1952

2,608,267

UNITED STATES PATENT OFFICE 2,608,267

HORIZONTAL GAS SCRUBBER

Raymond C. Ortgies, Homewood, Ill., assignor to Whiting Corporation, a corporation of Illinois Application November 23, 1949, Serial No. 129,061

10 Claims. (Cl. 183—22)

My invention refers to gas scrubbers, particularly to the type intended for removing solids or other foreign particles from a stream of gas. In general, my invention is an improvement upon the gas washer disclosed in Fisher 2,310,411, dated February 11, 1943 and has as a primary object improvement of the efficiency and capacity of the washer therein disclosed.

More particularly, the important objects of my invention include the provision of a gas washer wherein the foreign particles in a gas stream are more forcibly impinged upon a wet surface, which is less subject to clogging, which is capable of continuously treating highly contaminated air in a satisfactory manner, and which occupies relatively little floor space or head room.

Further objects of my invention include the provision of improved circulation or course of air travel within the scrubber and improved means for collecting and discharging the collected sludge. Additional objects of my invention will be disclosed in the course of the following description and in the appended drawings, in which:

Fig. 4 is a plan view taken along the line 4—4 of Fig. 1.

In brief, my scrubber includes a tank having an open top and containing a weir, which divides the tank into settling and clear water sections and maintains a predetermined water level in a settling section of the tank. Above the settling section is a housing having flat upwardly extending side and end walls and a semi-cylindrical roof divided into the first and second compartments by a diaphragm, which, with one of the end walls, extends downwardly into the tank to a point below the water level, thus forming a water seal across the bottom of the compartments.

The first compartment is provided with a tangential air inlet through which contaminated air is drawn and with axially disposed water sprays which discharge water outwardly into contact with the walls. As the air enters the first compartment from the inlet, it strikes a curved baffle which terminates at a point below the air inlet and approximately midway between the side walls. Preferably this baffle, which extends through the diaphragm and between the end walls, is curved about the same axis as the semi-cylindrical roof. Dust particles in the contaminated air are wetted partially by contact with suspended droplets of water and partially by impingement on the wet walls of the compartment, from which they are washed by the spray downwardly into the tank.

Impingement of the particles upon the compartment walls is of the utmost importance and is accomplished in part by centrifugal force. In my device, however, a substantial portion of the dust is removed by impingement with the side wall of the compartment directly across from the air inlet and lower edge of the baffle. After leaving the baffle, the air with its burden of dust will travel at relatively high velocity in a straight path across a relatively wide elongated space above the water level in the tank into contact with the side wall, where its direction is suddenly changed. This in effect drives the dust particles against the wet side wall and insures thorough wetting.

A tube extends from within the first compartment through the diaphragm to the second compartment. The outlet of the tube is surrounded by suitable baffled vanes disposed in the second compartment, which impart a swirling motion to the air, thus furthering the dust wetting and precipitating action. From the second compartment the cleaned air is drawn through a short inwardly flared tubular member extending through an end wall of the housing into communication with a water eliminator device, from which it passes into a fan for discharge into the room or a suitable duct system. Ordinarily, a pump is provided for forcing water from the clear water section of the tank into a pipe and through the sprays, thus recirculating the water and reducing the water demand. Automatic means may be provided for discharging sludge from the settling portion of the tank.

Figure 1:
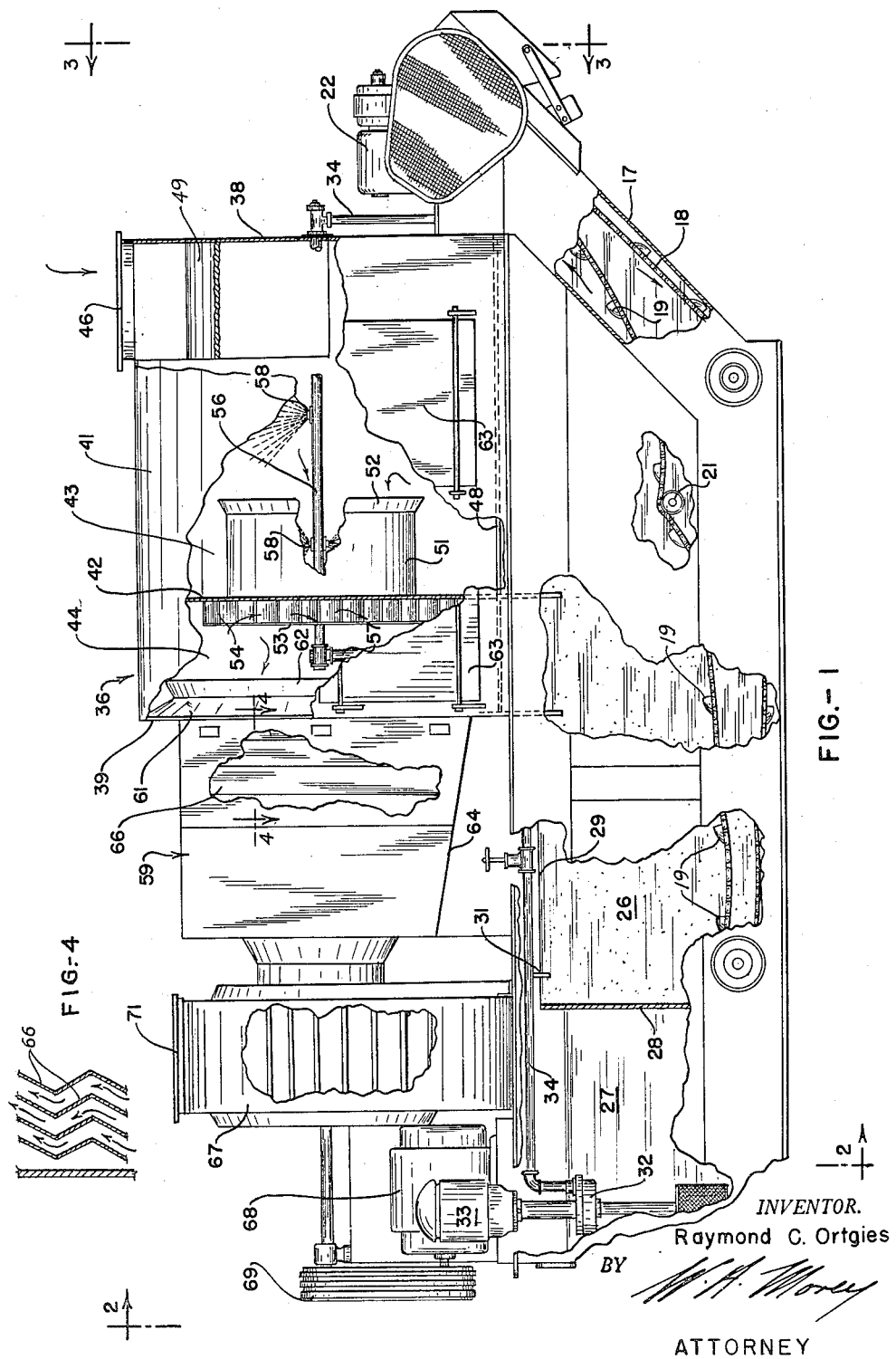
Fig. 1 is a partially sectioned elevation of my gas scrubber.
Figure 2:
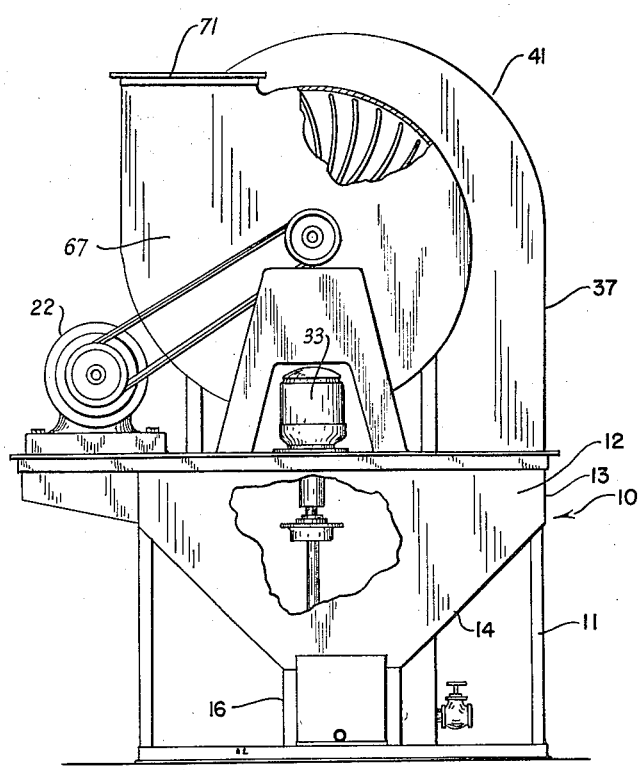
Fig. 2 is a partially broken away end view of my scrubber taken along the lines 2—2 of Fig. 1.
Figure 3:
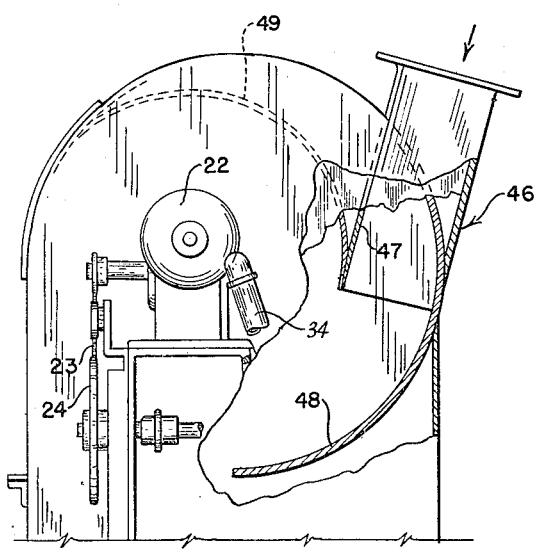
Fig. 3 is a partially broken away view of the opposite end of my device taken along the line 3—3.

The tank above-mentioned is generally designated by the numeral 10 in Fig. 1, and is suitably supported upon a frame 11. Preferably the tank 10 is of rectangular configuration, having an open top defined by upright end walls 12 and side walls 13. The bottom 14 of the tank preferably slopes downwardly and inwardly to a rectangular trough 16. A chute 17 of similar configuration and dimensions may extend downwardly through one of the tank end walls 12 into communication with the trough 16, and encloses a continuous chain conveyer 18, having transverse flights 19. The conveyer 18 is trained over suitably disposed idlers 21 in the tank 10, and is driven by a motor 22 through a chain 23 and sprockets 24 in conventional manner. Sludge deposited in the tank falls by gravity into the trough 16, from which it is carried by the conveyer upwardly to a suitable point of discharge.

The tank 10 is preferably divided into a settling section 26 and a clear water section 27 by a weir 28 or the like, disposed beyond the end of the conveyor 18, and which serves to maintain the water in the settling section of the tank at a predetermined level, indicated at 29. A skimmer 31 may project downwardly into the water near the top of the weir 28 and serves to prevent discharge of floating objects from the settling section 26 into the clear water section 27. In the clear water section I provide a pump 32 driven by a motor 33, which operates to discharge water under pressure into a pipe 34.

Above the settling section 26 of the tank 10, I provide a housing, generally designated 36, which includes flat side walls 37 extending upwardly from the edges of the side walls 13, a first end wall 38 extending upwardly from an end wall 12, a second end wall 39, which extends across the tank 10 and downwardly into the tank to a point below the water level 29, and a semicylindrical roof 41, which completes the enclosure. The roof 41 is curved about a major axis and is of uniform radius. A diaphragm 42, parallel to the end walls 38 and 39, divides the housing 36 into a first compartment 43 and a second compartment 44, said diaphragm also extending downwardly into the tank to a point below the water level 29. Both compartments are therefore sealed by the water in the tank 10.

The first compartment 41 is provided with a tangential air inlet, generally designated 46, which extends downwardly into the compartment near the junction of the roof 41 and one of the side walls 37 at an angle of not less than 15 degrees above a horizontal plane. Ordinarily, the air inlet 46 is a duct, the walls of which extend inwardly into the compartment 43, as indicated at 47. Immediately below the air inlet 46 is a baffle 48, which is curved about the major axis, and which forms in effect an extension of the roof 41. The baffle 48 extends from the end wall 38 through the diaphragm 42 to the end wall 39 and from approximately the junction of the roof 41 and side wall 37 downwardly, and laterally to a point approximately midway between the side walls 37 above the water level and below the major axis, thus defining with the opposite side wall 37 an elongated space which communicates freely with the water in the settling portion of the tank 10, and which is approximately equal in width to the radius of the roof 41. A second baffle 49 may also be provided and is curved about a minor axis, extending from the inner end of the wall 47 of the inlet 46 upwardly to the roof 41, its width being equal to the width of the inlet 46.

An axially disposed tube 51 having an outwardly flaring mouth 52 extends from within the compartment 43 through the diaphragm 42 and discharges air against a transverse plate 53, which is disposed in the compartment 44 in spaced relation to the diaphragm 42. A plurality of stationary swirling vanes 54 are mounted between the diaphragm 42 and the plate baffle 53 in such position as to discharge air from the tube 51 into the compartment with a violent swirling action, which tends to throw the air into circular motion and outwardly into contact with the walls of the compartment 44.

An axially disposed pipe 56 extends through the first compartment 43 and tube 51 to a discharge pipe 57, which communicates with the tank 10. Outwardly directed spray outlets 58 are provided along the pipe 56 within the compartment 43 and within the tube 51 for discharging a spray of water outwardly against the walls of the compartment 43 and against the baffles 48 and 49, continuously washing these walls and allowing the contaminated water and dust to drain downwardly into the settling portion 46 of the tank 10.

Air from the second compartment 44 is discharged through an outlet formed at the end wall 39 into a water eliminator, generally designated 59. The outlet is surrounded by a tubular member 61, which extends radially inwardly into compartment 44 to a collar 62, which flares diagonally outwardly. Access doors 63 may be provided in the side walls 37 for the compartments 43 and 44.

The water eliminator 59 includes a housing 64 within which is mounted a series of upright zigzag plates 66 arranged to cause air discharged from the compartment 44 to travel in a tortuous path. A fan 67, driven by a motor 68 through belts 69 is arranged to draw air from the water eliminator 59 and to discharge the air from an outlet 71 into the room or a duct system, as desired.

In operation, the necessary quantity of water is added to the tank 10, filling the settling portion 26 to the level 29. The clear water portion 72 is also filled to approximately the same level, but in operation will usually fall to a somewhat lower level, since the pump 32 forces a certain amount of water into the housing 36. The fan 67 is started, thereby drawing air into the inlet 46. The pump 32 is also placed in operation to force clear water through the pipe 56 and sprays 58 outwardly against the walls of the compartment 43 and the baffle 48. The contaminated air drawn inwardly through the inlet 46 is directed downwardly against the baffle 48, which causes it to assume a circular path while in contact with the baffle. Since the velocity of the air and dust carried thereby is high, centrifugal force acts to throw the heavier dust particles outwardly into contact with the wet surface of the baffle 48, where they become coated with moisture and are retained until washed into the tank 10 by the action of the sprays 58. The sprays 58 also create a suspension of water droplets in the compartment 43, which are forcibly impinged by the dust particles, thereby aiding the wetting action of my device.

As the stream of air leaves the baffle 48, it is no longer forced to follow a circular path, and therefore travels laterally in a relatively straight line across the space defined by the end of the baffle 48 and the oposite wall 37 at a relatively high velocity. The side wall 37 deflects the air in this stream upwardly, changing its direction suddenly and thus allowing the heavier dust particles to impinge forcibly against the wet surface of the side wall 37. From here the particles are washed downwardly directly into the settling portion 26 of the tank 10, which lies immediately below the opening defined by the end of the baffle 48 and the side wall 37. As the air stream passes upwardly along the side wall 37, it encounters the curved roof 41, which again deffects the air stream into a circular path somewhat suddenly. This change in direction, plus centrifugal force, tends in a manner previously described to drive the solid and liquid particles carried by the air stream into contact with the compartment walls.

The portion of the air stream near the end wall 38 is deflected before reaching the roof by the baffle 49, which is a semi-cylindrical section generated about a minor axis displaced from the major axis. As a result, the recirculating stream joins the stream of air entering through the inlet 46 smoothly and without creating excessive turbulence. The air stream, because of its circular motion tends to throw the particles of dust towards the periphery of its path. As a result the body of air revolving near the axis of the compartment 43 is relatively free from foreign material, being the portion drawn inwardly through the tube 51, where it is acted upon by a spray 58 and discharged into the second compartment 44 through the vanes 54. At this point there are a large number of water droplets carried by the air, which together with the dust particles are forcibly impacted by the vanes and discharged with a swirling circular motion. A large quantity of the remaining dust is extracted by the vanes, which drain downwardly along the diaphragm 42 and into the settling portion 26 of the tank 10. The swirling motion of the air in the compartment 44 eliminates the remainder of the dust, as well as a substantial portion of the entrained water droplets, which tend to concentrate along the periphery of the swirling body of gas. The fan 67 then draws air from the central portion of the compartment 44 through the water eliminator plates 66, where the last portion of the water is removed. The plates 66 are arranged in such manner as to permit the collected water to drain downwardly to the sloping bottom of the housing 64, which discharges along the inner side of the end wall 39 into the settling portion 26 of the tank 10.

The sludge washed downwardly from the walls collects in the settling portion 26, where it gradually sinks to the trough 16. The baffle 48, being above the surface of the water, prevents the air stream from imparting a rotary, turbulent motion to the water in the tank 10, and thus assists in settling the collected solids. The clarified water overflows the weir 28 into the clear water section 27 and is recirculated by the pump 32 to the housing 36. The conveyer 18 may be operated either continuously or periodically, as desired, to scrape the settled sludge from the trough 16 to a suitable discharge point. During operation it is usually necessary to add a small amount of water to the tank to compensate for the water carried out by the sludge and other incidental losses.

Since certain modifications may be made in the details hereinbefore described, I do not limit myself to the precise form of apparatus herein disclosed, except insofar as defined and limited by the appended claims.

I claim:

1. A gas scrubber comprising a housing having end walls, flat upwardly extending side walls, and a semi-cylindrical roof curved about a major axis, a diaphragm dividing the housing into first and second compartments and having an axial opening therein, means for maintaining a water seal across the bottom of the compartments, a tangential air inlet in the first compartment, a baffle in the first compartment curved about the major axis in the path of inlet air and extending from below the air inlet downwardly to a point approximately midway between the side walls, water sprays in the first compartment for wetting the walls and the baffle, stationary swirling vanes in the second compartment for imparting a rotary motion to the air passing through the axial opening in the diaphragm, and a fan communicating with an air outlet in one of the end walls for passing air through the housing.

2. A gas scrubber comprising a housing having end walls, flat upwardly extending side walls, and a semi-cylindrical roof curved about a major axis, a water tank below the housing, a diaphragm dividing the housing into first and second compartments and extending downwardly into the tank, means for maintaining a water level in the tank above the lower edge of the diaphragm for sealing the compartments, a downwardly directed tangential air inlet in the first compartment, a water spray in the first compartment for continuously washing the compartment walls, vanes in the second compartment arranged around an axial opening formed in the diaphragm for imparting a swirling motion to air passing from the first to the second compartment, and means for exhausting air from the second compartment.

3. A gas scrubber comprising a housing having end walls, flat upwardly extending side walls, and a semi-cylindrical roof section, the side and end walls of said roof being curved about a major axis, a water tank below the housing, a diaphragm dividing the housing into first and second compartments and extending downwardly into the tank, means for maintaining a water level in the tank above the lower edge of the diaphragm for sealing said compartments, a tangential air inlet in the first compartment, a water spray in the first compartment near the major axis for continuously spraying water on to the walls of the compartment, an axial tube extending through the diaphragm and having an inlet in the first compartment spaced from the diaphragm, stationary vanes arranged around the tube outlet in the second compartment for imparting a swirling motion to the air, and means for exhausting air from the second compartment.

4. A gas scrubber comprising a housing having end walls, flat upwardly extending side walls, and a semi-cylindrical roof curved about a major axis, a water tank below the housing, a diaphragm dividing the housing into first and second compartments and extending downwardly into the tank, means for maintaining a water level in the tank above the lower edge of the diaphragm for sealing the compartments, a tangential air inlet in the first compartment, a baffle in the first compartment extending downwardly in the path of inlet air from below the air inlet to a point approximately midway between the side walls, the lower edge of said baffle being above the level of water in the tank, a water spray in the first compartment for continuously washing the compartment walls, vanes in the second compartment arranged around an axial opening formed in the diaphragm for imparting a swirling motion to air passing from the first to the second compartment, and means for exhausting air from the second compartment.

5. A gas scrubber comprising a housing having end walls, flat upwardly extending side walls, and a semi-cylindrical roof curved about a major axis, a water tank below the housing, a diaphragm dividing the housing into first and second compartments and extending downwardly into the tank, means for maintaining a water level in the tank above the lower edge of the diaphragm for sealing the compartments, a downwardly directed tangential air inlet in the first compartment, a longitudinal baffle extending through the first and second compartments curved about the major axis and extending from below the air inlet downwardly and inwardly to a point approximately midway between the side walls and above the water level in the tank for discharging inlet air normally to a flat side wall, a water spray in the first compartment for continuously washing the compartment walls, vanes in the second compartment arranged around an axial opening formed in the diaphragm for imparting a swirling motion to air passing from the first to the second compartment, and means for exhausting air from the second compartment.

6. A gas scrubber comprising a housing having end walls, flat upwardly extending side walls, and a semi-cylindrical roof section, said roof being curved about a major axis, a water tank below the housing, a diaphragm dividing the housing into first and second compartments, and extending downwardly into the tank, means for maintaining a water level in the tank above the lower edge of the diaphragm for sealing said compartments, a downwardly directed tangential air inlet in the first compartment, a longitudinal baffle in the first and second compartments curved about a major axis and extending from below the air inlet downwardly and inwardly to a point approximately midway between the side walls and above the level in the tank for directing air normally against a flat side wall, a water spray in the first compartment near the major axis for continuously spraying water on to the walls of the compartment, an axial tube extending through the diaphragm from a point within the first compartment, stationary vanes arranged around the tube outlet in the second compartment for imparting a swirling motion to the air, and means for exhausting air from the second compartment.

7. A gas scrubber comprising an elongated tank having an open top, means for maintaining a predetermined water level in the tank, a housing extending over a portion of the tank and including flat side walls extending upwardly from the edges of the tank, a semi-cylindrical roof connecting the side walls and curved about a major axis, a first end wall extending upwardly from an end of the tank, a second end wall having an axial outlet formed therein and extending downwardly into the tank below the water level, a transverse diaphragm dividing the housing into first and second compartments and extending downwardly into the tank below water level, an axially disposed tube extending through the diaphragm from a point within the first compartment, vanes in the second compartment arranged around the tube outlet for imparting a swirling motion to the air, a plate baffle across the edges of the vanes and the end of the tube for directing air through said vanes, an axially disposed pipe in the first compartment and in said tube, said pipe having a plurality of outlets for directing water radially from the pipe into contact with the walls of the first compartment and tube, a downwardly directed tangential air inlet in the first compartment near the junction of a side wall and the roof, a baffle curved about the major axis and disposed above the water level in the first compartment, said baffle being disposed in the path of air entering the first compartment and having a lower edge approximately midway between the side walls, a water eliminator communicating with a housing outlet in the second end wall, and a fan for drawing air through the housing and water eliminator.

8. A gas scrubber comprising an elongated tank having an open top, means for maintaining a predetermined water level in the tank, a housing extending over a portion of the tank and including flat side walls extending upwardly from the edges of the tank, a semi-cylindrical roof connecting the side walls and curved about a major axis, a first end wall extending upwardly from an end of the tank, a second end wall having an axial outlet formed therein and extending downwardly into the tank below the water level, a transverse diaphragm dividing the housing into first and second compartments and extending downwardly into the tank below water level, an axially disposed tube extending through the diaphragm from a point within the first compartment, vanes in the second compartment arranged around the tube outlet for imparting a swirling motion to the air, a plate baffle across the edges of the vanes and the end of the tube for directing air through said vanes, an axially disposed pipe in the first compartment and in said tube, said pipe having a plurality of outlets for directing sprays of water radially from the pipe into contact with the walls of the first compartment and tube, a downwardly directed tangential air inlet in the first compartment near the junction of a side wall and the roof, a baffle curved about the major axis and disposed above the water level in the first and second compartments, said baffle being disposed in the path of air entering the first compartment and having a lower edge approximately midway between the side walls, a water eliminator communicating with the housing outlet in the second wall, a fan for drawing air through the housing and water eliminator, and a pump for forcing the water from the tank through the pipe.

9. A gas scrubber comprising an elongated tank having an open top, water level relating means divding the tank into a settling section and a clear water section, a housing over the settling section of the tank including flat side walls extending upwardly from the edges of the tank, a semi-cylindrical roof connecting the side walls and curved about a major axis, a first end wall extending upwardly from an end of the tank, a second end wall having an axial outlet formed therein and extending downwardly into the tank below the water level, a transverse diaphragm dividing the housing into first and second compartments and extending downwardly into the tank below water level, an axially disposed tube extending through the diaphragm from a point within the compartment, vanes in the second compartment arranged around the tube outlet for imparting a swirling motion to the air, a plate baffle across the edges of the vanes and the end of the tube for directing air through said vanes, an axially disposed pipe in the first compartment and in said tube, said pipe having a plurality of outlets for directing water sprays radially from the pipe into contact with the walls of the first compartment and tube, a downwardly directed tangential air inlet extending into the first compartment near the junction of a side wall and the roof, a baffle curved about the major axis and disposed above the water level in the first and second compartments, said baffle being disposed in the path of air entering the first compartment and having a lower edge approximately midway between the side walls, a water eliminator communicating with the housing outlet in the second wall, a pump for forcing water from the clear water section of the tank through the pipe, and conveyer means for removing sludge from the settling section of the tank.

10. A gas scrubber comprising a housing having end walls, flat upwardly extending side walls, and a semi-cylindrical roof curved about a major axis, a water tank below the housing, a diaphragm dividing the housing into first and second compartments and extending downwardly into the tank, means for maintaining a water level in the tank above the lower edge of the diaphragm for sealing the compartments, a downwardly directed tangential air inlet extending into the first compartment, a baffle in the first and second compartments extending downwardly and laterally from below the air inlet in the first compartment at a point approximately midway between the side walls, the lower edge of said baffle being above the level of water in the tank, a second baffle in the first compartment curved about a minor axis and extending from the air inlet upwardly to said roof, a water spray in the first compartment for continuously washing the compartment walls, vanes in the second compartment arranged around an axial opening formed in the diaphragm for imparting a swirling motion to air passing from the first compartment and means for exhausting air from the second compartment.

RAYMOND C. ORTGIES.

REFERENCES CITED

The following references are of record in the file of this patent:

UNITED STATES PATENTS

| Number | Name | Date |
|---|---|---|
| 1,042,055 | Theisen | Oct. 22, 1912 |
| 2,239,595 | Cummings | Apr. 22, 1941 |
| 2,310,411 | Fisher | Feb. 9, 1943 |
| 2,354,674 | Fisher | Aug. 1, 1944 |
| 2,484,277 | Fisher | Oct. 11, 1949 |